United States Patent
Robinson et al.

[11] Patent Number: 5,308,141
[45] Date of Patent: May 3, 1994

[54] UPHOLSTERY FABRIC

[75] Inventors: Frank Robinson; Gerald F. Day, both of Derbyshire; Keith Jeffcoat, Warwickshire, all of United Kingdom

[73] Assignee: General Motors Corporation, Detroit, Mich.

[21] Appl. No.: 412,173

[22] Filed: Sep. 25, 1989

[30] Foreign Application Priority Data

Sep. 27, 1988 [GB] United Kingdom ............... 8822638

[51] Int. Cl.⁵ ............................................. A47C 27/00
[52] U.S. Cl. ................................. 297/218; 297/226
[58] Field of Search ............... 297/218, 226, 224, 229

[56] References Cited

U.S. PATENT DOCUMENTS

| | | | |
|---|---|---|---|
| 2,801,682 | 8/1957 | Fridolph | 297/218 |
| 2,811,199 | 10/1957 | Morrill et al. | 297/226 |
| 3,801,154 | 4/1974 | Hultquist et al. | 297/226 X |
| 4,557,522 | 12/1985 | Isikawa | 297/218 X |

FOREIGN PATENT DOCUMENTS

| | | | |
|---|---|---|---|
| 668983 | 12/1965 | Belgium | 297/229 |
| 854850 | 4/1940 | France | 297/226 |
| 953739 | 12/1949 | France | 297/226 |
| 817609 | 8/1959 | United Kingdom | 297/218 |

*Primary Examiner*—Jose V. Chen
*Attorney, Agent, or Firm*—Davis Hoxie Faithful & Hapgood

[57] ABSTRACT

A piece of upholstery fabric for covering three-dimensional supports such as vehicle seat bases and seat backs is machine knitted, preferably in a mainly double jersey structure, with integral tubular portions. These serve as anchorage devices for securing the fabric piece to the support which it is to cover using rods or tapes which are threaded through the tubular portions. The tubular portions may be located at the margins of the fabric piece and also at intermediate positions where the fabric piece needs to be held down, for example in a depression in the support. They may project from a surface of the fabric piece and may be like loops or they may be in the form of tubular hems or a tube lying between front and rear surfaces of a double jersey structure.

11 Claims, 2 Drawing Sheets

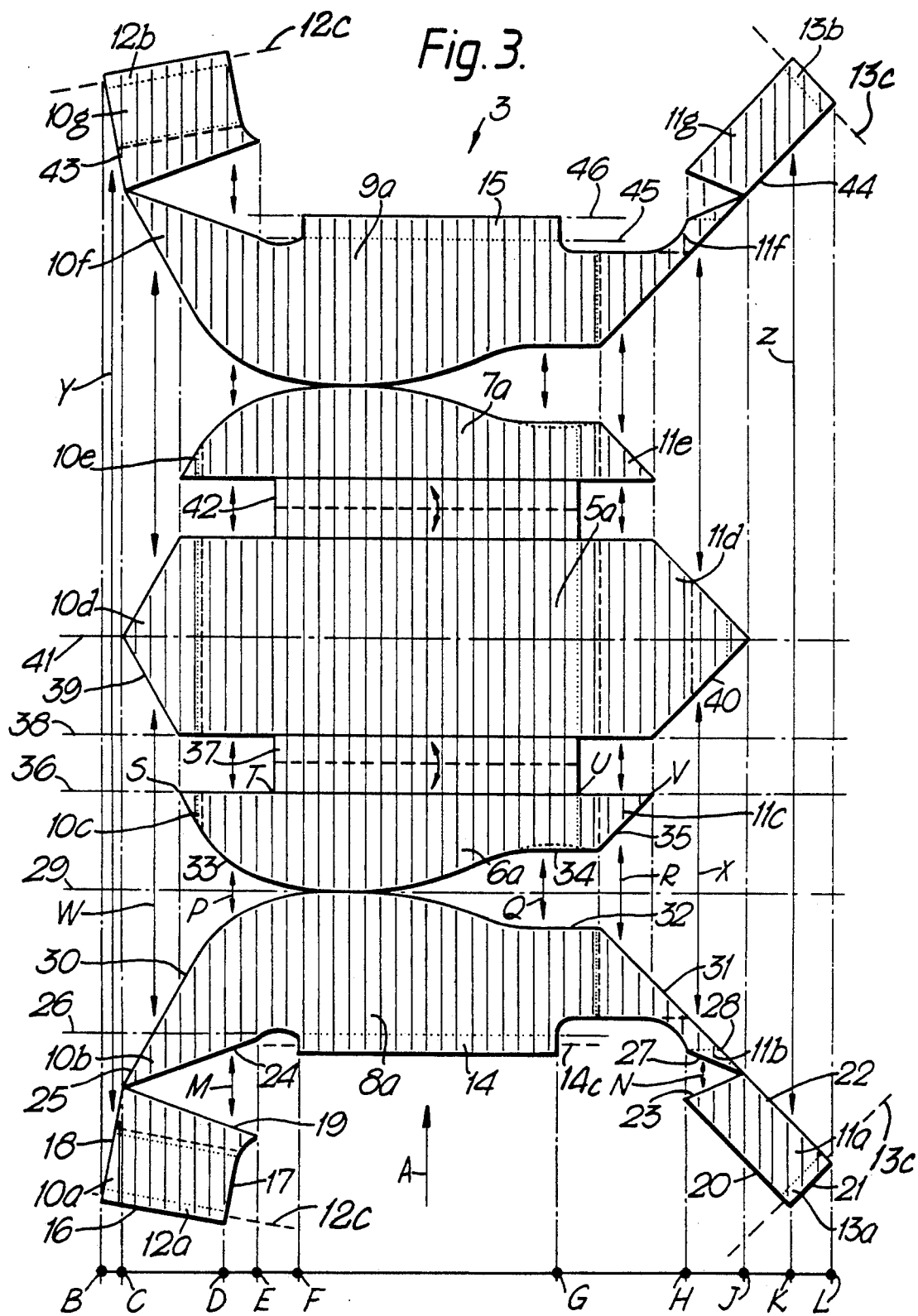

UPHOLSTERY FABRIC

Background of the invention

This invention relates to upholstery fabric intended to cover at least part of the surface of a three-dimensional support, for example a cushion of a vehicle seat, especially an automobile seat.

The usual method of manufacturing a vehicle seat cover involves cutting out shaped pieces of woven fabric intended to make the seat back cover and subsequently sewing these pieces together to form the base and back covers, fashioning lines being introduced in some areas of the fabric if necessary. It is also necessary to provide anchorage devices at the edges of the base and back covers to enable attachment of the covers to respective cushions. Usually these anchorage devices take the form of hollow sewn hems which can be secured to metal rods recessed into the cushions. If the base and/or back cushions comprise bolsters, it is also necessary to provide anchorage devices, usually in the form of open looped flaps, on the undersurface of the cover, in order to conform the cover to the shape of the upper surface of the cushion. Apart from being wasteful in fabric, this method of manufacturing vehicle seat covers is extremely time-consuming and is therefore very costly.

Recently, it has been found possible to knit one-piece upholstery fabrics which, without the need for sewing portions together, have the desired shapes to serve as covers for the base and back cushions of a vehicle seat. One object of the present invention is to provide such a piece of knitted upholstery fabric in a form which facilitates its attachment to a three-dimensional support, such as a vehicle seat cushion.

SUMMARY OF THE INVENTION

According to one aspect of the invention a piece of machine-knitted upholstery fabric for covering at least part of the surface of a three-dimensional support is characterised by one or more portions of tubular fabric integrally knitted with the upholstery fabric piece at location(s) where each such tubular portion can serve as an anchorage device for facilitating the securing of the upholstery fabric piece to said support. Location of a tubular fabric portion at or close to one or more margins of the fabric piece is convenient for anchorage purposes. For example, a tubular portion may be integrally knitted along one or more margins of the fabric piece.

One or more tubular fabric portions may also be located intermediate the margins of the fabric piece if intermediate anchorage is required. This may be necessary, for example, where the three-dimensional support has a well defined change in shape, particularly if concave, to which it is desired that the upholstery fabric cover should conform. Intermediate anchorage may also be desirable just to maintain location of the cover fabric on the support against distorting forces encountered in use. This is particularly important where the cover fabric has a pattern which needs to remain in a desired position relative to the areas or margins of the support being covered.

The support may be, for example, a vehicle seat base or seat back so that the piece of upholstery fabric according to the invention comprises a cover for the seat base or the seat back.

The provision of integrally-knitted tubular portions which can serve as anchorage devices for the piece of upholstery fabric gives a number of important advantages. It allows the provision of an upholstery fabric piece, for example a vehicle seat cover, which is in a finished state without the need for any hemming or sewing operations. A vehicle seat cover made according to the invention can have the rods or tapes inserted and then be fitted directly to the vehicle seat.

The intergral nature of the tubular portions also gives a neater appearance to the fabric piece and allows greater reproducibility of fit, appearance and quality in volume production, which is particularly important for the vehicle seat cover business. There is no sewing thread to match to the yarn of the fabric or to produce loose threads or ends which need to be removed. Integral knitting of the tubular portions also produces a strong firm structure which allows better fit and durability in use. The puckering which can occur with sewn attachments is easier to avoid because of the close control which the knitting process allows in positioning the tubular portions and in the yarn tensions employed during knitting.

The piece of upholstery fabric according to the invention is preferably knitted in a mainly double jersey structure. It may be knitted on machines having independently operable needles disposed in at least two needle beds such as a flat V-bed knitting machine.

As mentioned, the tubular fabric portion may be integrally knitted in the form of a tubular hem at the margin of the piece. Alternatively, it may be formed as a tubular portion which is located between the front and rear surfaces of the fabric piece in the case of a double jersey construction. In another variation, it may be in the form of a tubular portion which projects from a surface of the fabric piece into which the base of the tubular fabric portion is integrally knitted. The latter two formations are suitable for the case where the tubular fabric portion is located at an intermediate location with respect to the margins of the upholstery fabric piece.

The axial length of a tubular portion may be chosen to suit the desired method of anchorage of the fabric piece to the support. For example, a relatively long tubular portion may be knitted where it is desired to anchor the fabric piece along the whole of a given length such as, for example, along the front edge of a vehicle seat using a rod threaded through the tube and located in a fixing under the seat.

In other cases, a comparatively short length of tubing may be sufficient so that it is like a loop of knitted fabric. Such loops may be hooked over individual fixings on the support or used in conjunction with other loops using rods, cords or tapes threaded through them to effect anchorage of the fabric piece to the support.

Whatever the form of a tubular portion its axis may be disposed parallel to, at right angles to, or at any desired inclination to, the wales of the fabric piece.

In some cases, a tubular fabric portion may be inclined or at right angles to another tubular fabric portion and the two tubular fabric portions may meet at a junction. This may be required, for example, in a vehicle seat cover where a flexible rod is to be located in a tubular fabric portion running across the seat squab cover from one margin to the other margin for the purpose of holding the cover down in a depression in the seat squab. Where the tubular fabric portion running across the cover meets a tubular fabric portion at the margin of the cover, for example, then access to the said first tubular fabric portion needs to be provided so that, for example the flexible rod referred to can be inserted. Such access may take the form of a hole knitted in each wall of the marginal tubular portion at the junction of the two tubular portions.

The invention includes a method of machine knitting a piece of upholstery fabric for covering at least part of the surface of a three-dimensional support characterised by the step of integrally knitting one or more portions of tubular fabric with the upholstery fabric piece at location(s) where each such tubular portion can serve as an anchorage device for facilitating the securing of the upholstery fabric piece to said support.

The method according to the invention is particularly suitable for knitting fabric pieces having any known structure of mainly double jersey kind, for example any rib structure, or a two colour jacquard structure with a bird's eye backing. The aforesaid tubular fabric portions may be of single or double jersey structure.

The method according to the invention may be carried out on a flat V-bed knitting machine. Such machines may have the capacity for shaping the fabric piece in the knitting process so that it will fit the part of the three-dimensional support which it is to cover.

BRIEF DESCRIPTION OF THE DRAWINGS

The invention will now be described, by way of example, with reference to the accompanying drawings, in which:

FIG. 3 is a schematic diagram illustrating a method of knitting the cover of the seat base of FIG. 1.

DESCRIPTION OF PREFERRED EMBODIMENT

Figure 1:
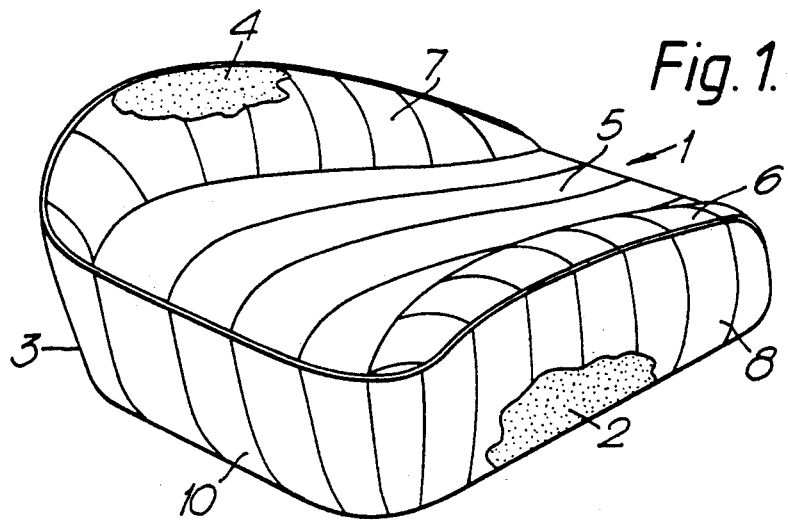
FIG. 1 is a perspective view of the base part of an automobile seat.

FIG. 1 shows a vehicle seat base, generally designated by the numeral 1, which comprises a cushion 2 covered with a fabric piece 3. The cushion 2 has bolster portions 4 adjacent to each of its sides, and the fabric piece 3 is tightly secured to metallic rods (not shown) recessed into the cushion 2. The fabric piece 3 comprises an upper surface portion 5, bolster-covering portions 6 and 7, side portions 8 and 9 (only one (8) of which can be seen in this Figure), a front portion 10 and a rear portion 11 (which is not visible in this Figure).

Figure 2:
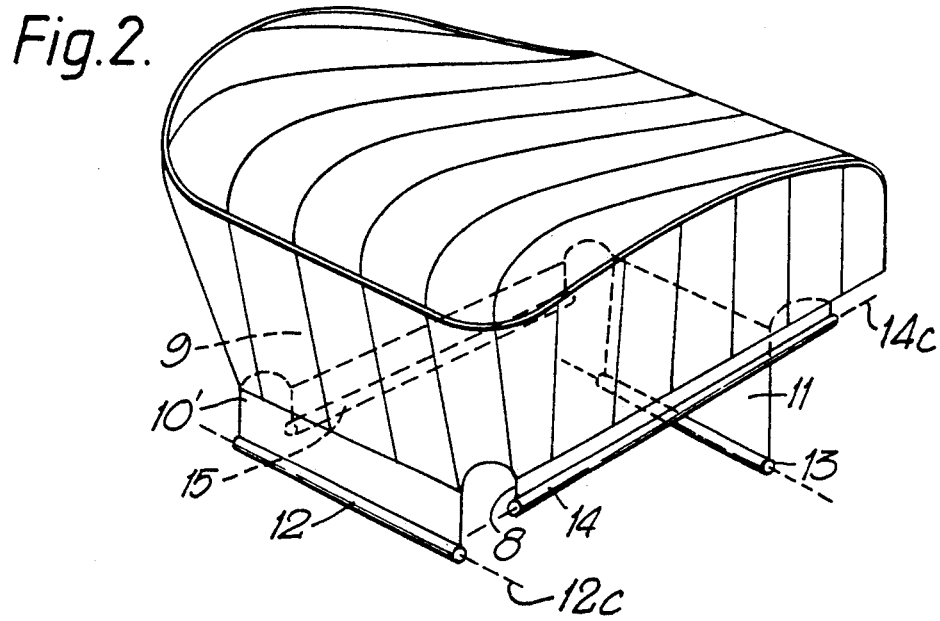
FIG. 2 is a view similar to FIG. 1 but showing the seat cover released from attachment to its cushion.

FIG. 2 shows the fabric piece 3 released from its attachment to the cushion 2. It will be seen that the front and rear portions 10 and 11 of the fabric piece 3 have tubular hems 12 and 13, respectively along their edges for attachment to two of the aforesaid metallic rods adjacent the front and rear of the undersurface of the cushion 2, and that the side portions 8 and 9 comprise tubular hems 14 and 15, respectively, along their edges for attachment to another two of said metallic rods which are disposed adjacent opposite sides of the undersurface of the cushion.

FIG. 3 is a diagram showing one way in which the fabric piece 3 of FIGS. 1 and 2 can be knitted as a one-piece fabric of mainly double jersey structure on a flat V-bed knitting machine provided with a conventional presser foot device and loop holding-down device for holding down the knitted fabric between the opposed needle beds of the machine. The direction of knitting, and hence the direction in which wales lie, is indicated by the arrow A in FIG. 3. It is such that wales of the fabric piece 3 extend, as viewed in FIGS. 1 and 2, in the direction from the hem 14, up the side portion 8, across the bolster-covering portion 6, across the upper surface portion 5 from side to side of the latter, across the bolster-covering portion 7 and down the side portion 9 to the hem 15.

Referring to FIG. 3, the fabric areas 10a and 11a form parts of the front and rear portions 10 and 11, respectively, in FIG. 2, the fabric area 8a forms the side portion 8 in FIG. 2 and has end portions 10b and 11b which form further parts of the front and rear portions 10 and 11, respectively; the fabric area 6a forms the bolster-covering portion 6 in FIG. 2 and has end portions 10c and 11c which form further parts of the front and rear portions 10 and 11, respectively; the fabric area 5a forms the upper surface portion 5 in FIG. 2 and has end portions 10d and 11d which form further parts of the front and rear portions 10 and 11, respectively; the fabric area 7a forms the bolster-covering portion 7 in FIG. 2 and has end portions 10e and 11e which form further parts of the front and rear portions 10 and 11, respectively; the fabric area 9a forms the side portion 9 in FIG. 2 and has end portions 10f and 11f which form further parts of the front and rear portions 10 and 11, respectively; and the fabric areas 10g and 11g form the final parts of the front and rear portions 10 and 11, respectively.

In FIG. 3, the line BL represents a length of opposed needle beds of the machine on which the fabric piece 3 is knitted. Knitting begins on a few needles in the region of point D of the needle beds to commence formation of the fabric area 10a, more and more needles being brought progressively into action in the directions from D to B and from D to E of the needle beds to define the edges 16 and 17. When all the needles from D to B have been brought into action, needles are progressively made inactive in the direction from B to C as further courses are knitted in the direction of arrow A, to define edge 18, each of the needles made inactive along BC retaining its last knitted loop. When all the needles from D to E have been brought into action, needles are progressively made inactive in the direction from E to C as further courses are knitted in the direction of arrow A, to define the edge 19, each of the needles made inactive along EC retaining its last knitted loop. This completes the knitting of the fabric area 10a, the portion 12a of which, adjacent to the edge 16, is knitted in the form of a tubular hem, in a manner described hereinafter. The tubular fabric portion 12a has an axis which is inclined to the wales of the fabric piece 3 which extend in the direction of arrow A as mentioned.

At the same time as the knitting of fabric area 10a is begun, knitting is also begun on a few needles in the region of point K on the needle beds to commence formation of the fabric area 11a. Knitting of this area is performed on needles in the needle bed length HL, in the same way as just described for the fabric area 10a, to define the edges 20–23 of the area 11a. The portion 13a of the area 11a, adjacent to the edge 21, is also knitted in the form of a tubular hem, in a manner described hereinafter.

When the areas 10a and 11a have been knitted, knitting of the fabric consisting of areas 10b, 8a and 11b is commenced on needles at points C and J of the needle beds. During knitting of the area 10b and part of area 8a, needles previously made inactive between points C and E are progressively re-activated to join edge 19 to edge 24, as indicated schematically by the arrow M. At the same time, other needles are made progressively inactive in the direction from C towards E to define edge 25, each of these last mentioned needles retaining its last knitted loop. When the course designated 26 has been reached, knitting on needles between points C and E is stopped and knitting is commenced on needles between points F and G to begin the edge portion 14 of fabric area 8a up to course 26. The edge portion 14 is knitted as tubular fabric, in a manner described hereinafter. Tubular fabric portion 14 has an axis which is at right angles to the wales of the fabric piece 3 which extend in the direction of arrow A as mentioned. At the same time as the knitting of the area 10b and the left-hand portion of the area 8a are being performed, the fabric area 11b and the right-hand portion of the area 8a are knitted, up to the course 26, in the same way as just described for the area 10a and the left-hand portion of the area 8a. During this stage of the knitting, the edge 23 becomes joined to edge 27, as indicated schematically by the arrow N and an edge 28 is defined along area 11b.

When the fabric has been knitted up to course 26 in all these areas, knitting of the central portion of the area 8a is completed up to course 29, the needles being made progressively inactive, and retaining their last knitted loops, to define edges 30, 31 and 32.

Knitting of the area comprising portions 6a, 10c and 11c is then commenced, with the progressive reactivation of needles previously rendered inactive to define the edges 33, 34 and 35. During this stage of the knitting the right-hand part of the edge 30 becomes joined to the edge 33, as indicated schematically by the arrow P, edge 32 becomes joined to the edge 34, as indicated schematically by the arrow Q, and the left-hand part of edge 31 becomes joined to the edge 35, as indicated schematically by the arrow R. When the area comprising portions 6a, 10c and 11c has been knitted up to the course 36, knitting is stopped on needles between points S and T and between points U and V of course 36, each of the needles made inactive retaining its last knitted loop. Knitting is continued on selected needles between points T and U to knit the fabric area 37 up to the course 38. At this course 38, the needles previously made inactive at course 36 are all brought back into action and the knitting of the fabric area comprising portions 5a, 10c and 11d is commenced. During this stage of the knitting, needles previously made inactive during knitting of the edge 25 of the area 10b and the edge 28 of the area 11b are brought back into action progressively to define edges 39 and 40. In the performance of this stage of the knitting, the edge 39 becomes joined to the edge 25 and the left-hand part of the edge 30, as indicated schematically by the arrow W, and the edge 40 becomes joined to the right-hand part of the edge 31 and the edge 28, as indicated schematically by the arrow X. The edges 39 and 40 are completed when knitting reaches the course 41.

Course 41 represents the transverse centre-line of the fabric piece 3 and knitting of the remainder of the piece 3 from the course 41 onwards is performed by a procedure which is substantially the reverse of the procedure outlined above for knitting up to the course 41. During this stage of the knitting, a fabric area 42, similar to the area 37, is knitted between the fabric areas 5a and 7a and a tubular hem 15, similar to the hem 14, is knitted on the area 9a. As with hem 14, the axis of the tubular fabric portion comprising hem 15 is at right angles to the wales of the fabric piece 3.

In the knitting of the final fabric areas 10g and 11g, the needles made inactive along BC and JL during knitting of the areas 10a and 11a are brought back into action progressively to join the edge 18 of the area 10a to the edge 43 of the area 10g, as indicated schematically by the arrow Y, and to join the edge 22 of the area 11a to the edge 44 of the area 11g, as indicated schematically by the arrow Z. During this procedure, the fabric areas 10a and 10g become joined to form part of the front portion 10 (see FIG. 2) with the portions 12a and 12b joined end-to-end to form the tubular hem 12. At the same time, the fabric areas 11a and 11g become joined to form part of the rear portion 11 (see FIG. 2) with the portions 13a and 13b joined end-to-end to form the tubular hem 13.

All areas of the fabric piece 3, apart from the tubular hems 12a, 12b, 13a, 13b, 14 and 15 and the areas 37 and 42 are knitted with a mainly double jersey structure on both beds of the knitting machine.

The hem 15 in FIG. 3 extends between courses 45 and 46. At course 45 the knitting of double jersey structure stops and the knitting of two pieces of single jersey fabric, one on each bed of the machine, continues up to a course situated two courses before the course 46. Double jersey knitting is then resumed on both needle beds for two courses, up to course 46. The result of this is to give the hem 15 a tubular construction. On completion of the course 46, the hem 15 may be cast off the needles and the edge of double jersey fabric sewn to prevent unravelling. Alternatively, one or two courses of a fusible yarn may be knitted at the edge of hem 15 after completion of course 46. Subsequent fusion of this fusible yarn prevents unravelling of the two double jersey courses at and adjacent to course 46.

Procedures similar to that just described may be used for knitting the tubular hems 12b and 13b, but since the axes of the tubular fabric portions comprising these hems are inclined to the wale directions of the fabric areas concerned, steps must be taken, as knitting proceeds, progressively to reduce the number of needles employed to knit double jersey structure with a corresponding progressive increase in the number of needles employed to knit the two single jersey fabrics.

The tubular hems 12a, 13a and 14 may be knitted using procedures which are substantially the reverse of the procedures described above for knitting the tubular hems 12b, 13b and 15. Thus, for example, the hem 14 is commenced with a double jersey set-up on the two needle beds, which is followed by separate single jersey courses up to course 26. It will, of course, be appreciated that there is no need to take precautions to prevent unravelling of the initial double jersey structure of the hems 12a, 13a and 14.

Figure 4:
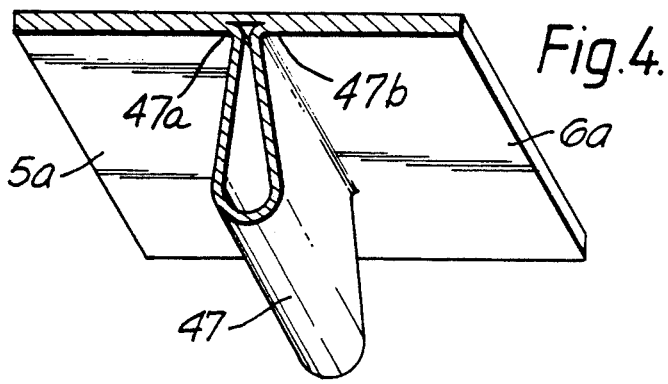
FIG. 4 is a perspective view, on an enlarged scale, of a portion of the cover knitted in the manner illustrated in FIG. 3.

In the above described knitting of the fabric piece 3, it will be appreciated that the knitting of the course 38 has the effect of joining the fabric areas 5a and 6a and forming the fabric area 37 into a loop projecting from the undersurface of the fabric piece 3. Likewise, the fabric area 42 forms another loop projecting from the undersurface of the fabric piece 3. FIG. 4 is a schematic perspective view showing one of these loops, designated 47 projecting from the fabric areas 5a and 6a. The fabric loop 47 has a base 47a and 47b which is knitted integrally into the fabric areas 5a and 6a. Instead of providing these loops on the undersurface of the fabric 3, tubes may be knitted into the fabric by knitting single jersey fabrics on both needle beds of the machine from course 36 to course 38.

When the knitting of the fabric piece 3 has been completed, it has the appearance of the seat base cover shown in FIG. 2. To fit the cover to the cushion 2 (FIG. 2), the loops 47 (FIG. 4) are slipped over metallic rods (not shown) recessed into the cushion where the bolsters 4 join the main seat part of the cushion. Then metallic rods are slipped into the tubular hems 12-15 and the rods are secured to the underside of the cushion.

Of course, the finished cover may be secured to its cushion without the employment of metallic rods in the manner just described. For example, a draw-cord may be threaded through the tubular hems 12-15 so that subsequent tightening of the cord draws the hems under the cushion. Again, if there is to be no provision enabling removal of the cover from its cushion, the cover may be secured to the cushion by a heat-shrinkable tape threaded through the tubular hems 12-15.

The invention is not, of course, limited to the knitting of the particular seat base cover shown in FIGS. 1 and 2. It is equally applicable to the knitting of seat back covers and to covers for seat bases of a different shape from that shown in FIG. 1.

What is claimed is:

1. A piece of machine-knitted upholstery fabric for covering at least part of a surface of a three-dimensional support, characterised by one or more portions of tubular fabric integrally knitted with the upholstery fabric piece at location(s) where each such tubular portion can serve as an anchorage device for facilitating the securing of the upholstery fabric piece to said support.

2. A piece of upholstery fabric as claimed in claim 1, characterised in that a tubular fabric portion is integrally knitted with the fabric piece at a location at or close to one or more margins of the fabric piece.

3. A piece of upholstery fabric as claimed in claim 1, characterised in that a tubular fabric portion is integrally knitted with the fabric piece with its axis at right angles to wales of the fabric piece.

4. A piece of upholstery fabric as claimed in claim 1, characterised in that a tubular fabric portion is integrally knitted with the fabric piece with its axis inclined to wales of the fabric piece.

5. A piece of upholstery fabric as claimed in claim 1, characterised in that it is knitted mainly in a double jersey structure.

6. A piece of upholstery fabric as claimed in claim 5, characterised in that a tubular fabric portion is integrally knitted with the fabric piece between front and rear surfaces of the double jersey structure.

7. A piece of upholstery fabric as claimed in claim 1, characterised in that a tubular fabric portion having a base projects from a surface of the fabric piece into which said base is integrally knitted.

8. A piece of upholstery fabric as claimed in claim 7, characterised in that said tubular fabric portion is in the form of at least one loop of knitted fabric.

9. A piece of upholstery fabric as claimed in claim 1, characterised in that the fabric piece is shaped to fit a part of the three-dimensional support which it is to cover.

10. An upholstery cover for a seat base or seat back of a vehicle seat, characterised by comprising a piece of machine-knitted upholstery fabric as claimed in claim 1.

11. A piece of upholstery fabric knitted by a method claimed in claim 1.

* * * * *

UNITED STATES PATENT AND TRADEMARK OFFICE
CERTIFICATE OF CORRECTION

PATENT NO. : 5,308,141
DATED      : May 3, 1994
INVENTOR(S): Frank Robinson et al.

It is certified that error appears in the above-identified patent and that said Letters Patent is hereby corrected as shown below:

Col. 5, line 45, cancel "10c" and substitute --10d--.

Signed and Sealed this

Twenty-ninth Day of November, 1994

Attest:

BRUCE LEHMAN

Attesting Officer    Commissioner of Patents and Trademarks